United States Patent [19]

Sarrazin et al.

[11] Patent Number: 4,495,740
[45] Date of Patent: Jan. 29, 1985

[54] WINDOW WITH INTEGRAL MOLDED FRAME AND PROCESS FOR MAKING SAME

[75] Inventors: Jean-Michel Sarrazin, Sainte Luce sur Mer; Bernard Chessel, Bagneux, both of France

[73] Assignee: Compagnie des Produits Industriels de l'Ouest, Nantes, France

[21] Appl. No.: 398,411

[22] Filed: Jul. 14, 1982

[30] Foreign Application Priority Data

Jul. 17, 1981 [FR] France .................. 81 13996

[51] Int. Cl.³ .......................... E04C 2/20; B29D 9/00; B29D 31/00; B29C 1/14
[52] U.S. Cl. .................. 52/309.1; 49/DIG. 2; 52/830; 264/255; 264/267; 264/273; 264/274
[58] Field of Search .................. 264/245–247, 264/242, 250, 255, 274, 275, 267, 268, 269, 273; 49/DIG. 2; 428/13, 14, 34; 52/309.1, 830

[56] References Cited

U.S. PATENT DOCUMENTS

| | | | |
|---|---|---|---|
| 2,544,140 | 3/1951 | Dofsen et al. | 264/247 |
| 2,577,350 | 12/1951 | Morin | 264/242 |
| 3,074,832 | 1/1963 | Gräff | 264/274 |
| 3,164,864 | 1/1965 | Kobayashi | 249/105 |
| 3,187,072 | 6/1965 | Morin | 264/242 |
| 3,276,078 | 10/1966 | Morin | 264/247 |
| 3,352,060 | 11/1967 | Thams | 49/DIG. 2 |
| 3,475,530 | 10/1969 | Cooper | 264/246 |
| 3,917,789 | 11/1975 | Heisler | 264/242 |
| 4,411,855 | 10/1983 | Fiebig et al. | 264/247 |

FOREIGN PATENT DOCUMENTS

| | | |
|---|---|---|
| 2709000 | 9/1978 | Fed. Rep. of Germany . |
| 1254438 | 1/1961 | France . |
| 2255152 | 12/1974 | France . |
| 2397280 | 7/1977 | France . |
| 1503039 | 3/1978 | United Kingdom . |

*Primary Examiner*—Willard E. Hoag
*Attorney, Agent, or Firm*—Oblon, Fisher, Spivak, McClelland & Maier

[57] ABSTRACT

A window with integral molded stile or frame has been disclosed along with a method for making it. The system according to the invention makes it possible to mold by injection two plastic parts in molding cavities (1', 2'). Material is first injected into the cavity (2') while a core (9) delimits a hole (15) in the molded part. Then the core (9) is removed from the hole (15) and the cavity (1') is placed facing the hole. Material is injected into this cavity. The material passes into the hole (15) and fills an enclosure (14) which molds an assembly stud for the parts molded in the cavities (1', 2').

The invention is applicable to making a window-stile unit for automobiles.

2 Claims, 3 Drawing Figures

WINDOW WITH INTEGRAL MOLDED FRAME
AND PROCESS FOR MAKING SAME

The present invention relates to a process and a system for molding and assembling parts, as well as to a set of parts assembled according to this process. More particularly, the invention concerns such a process and such a system in their application to the making of a unit consisting of a pane of transparent plastic and a support part for this pane, designed for example to equip an automobile.

In the automobile industry, vehicles are currently equipped with glass windows, these windows being held in place by various support and/or attachment parts. This solution has several drawbacks: it requires that a large number of miscellaneous parts be made; it poses problems of assembly and tightness; and the weight of the units constituted by the windows and the associated support parts is relatively major.

The present invention is aimed at establishing a process and supplying a system for making such units that do not have these drawbacks.

This goal of the invention is achieved with a process for molding and assembly of plastic parts according to which a first part is molded by making a passage in it; after hardening of the plastic, this passage is removed from the first part, and the plastic for a second part is injected into the molding cavity which connects with the passage thus cleared, so that this material fills the passage and is molded into and/or around it in the form of a part of assembling the two parts together.

For the implementation of this process, the invention makes it possible to create a system equipped with a molding cavity connected to a plastic injection channel, this system including:

(1) a movable core between a first position where it occupies the place of a passage to be made in a molded part in the molding cavity and a second position where it frees up this passage, after molding of the part, (2) a second molding cavity supplied by a second plastic injection cavity, this second cavity being movable between a first position where it does not communicate with its injection channel and a second position where it communicates both with this channel and the passage formed in a molded part in the first molding cavity, and (3) means for sequentially controlling the placement of the core in its first position, injection of plastic into the first molding cavity, removal of the core to its second position, and injection of plastic into the second cavity and the passage formed in the molded part in the first cavity.

This process and this system lend themselves in particular to the making of especially light window units when the window is made with a transparent plastic. The unit is molded in one piece, which facilitates assembly problems. Welding and/or mechanical joining of the parts of the unit make it possible to solve the tightness problems that arise in making a window unit intended for an automobile.

Other goals and advantages of the present invention will appear in the reading of the following description and the attached figures given by way of illustrative but nonlimiting examples.

Figure 1:
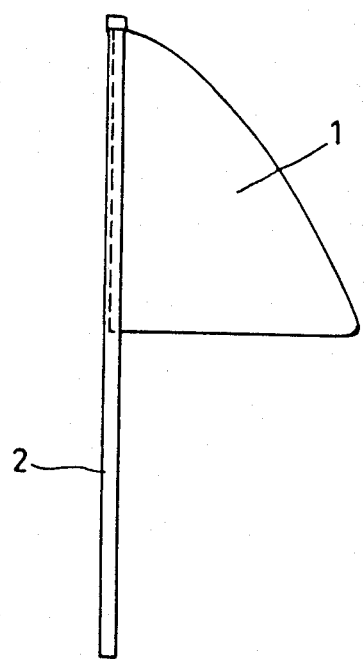
FIG. 1 shows a plastic window and its stile, the unit being made by the process according to the invention.

Reference will be had to FIG. 1, where a unit consisting of a transparent plastic window 1 has been shown attached to a stile 2. Such a unit may advantageously be used to form a part of the windows in an automobile. The use of a transparent plastic makes it possible to achieve a window that is much lighter than those usually used in the automobile industry, which are glass.

In addition to this weight advantage, so important for a vehicle, the use of plastic to form the window according to the present invention makes it possible to mold and assemble in a single sequence of automated operations a monobloc window-stile unit.

Figure 2:
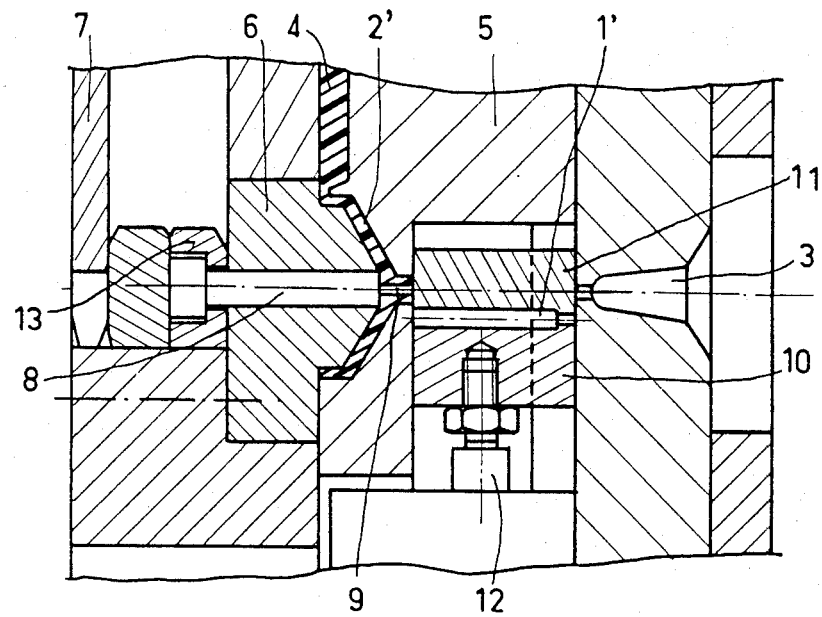
FIG. 2 is a partial view in cross-section of the molding and assembly system according to the invention, making it possible to make the unit in FIG. 1.

In order to achieve this unit, the molding and assembly system shown in FIG. 2 is used. This system essentially includes two molding cavities 1' and 2' intended to receive by injection the materials constituting the window and the stile, respectively. Injection channels 3 and 4 supply the cavities 1' and 2', respectively.

The cavity 2' is limited by two half-chills 5 and 6. In FIG. 2, a part 7 holds a rod 8 that is movable along its axis in a position where a core 9 formed at the right end of the rod passes through the cavity 2' to rest on a slab 10 movable perpendicular to the direction in which the rod moves.

This slab 10 is solid with a second slab 11. Together they limit the cavity 1' intended for the molding of the window. A jack 12 moves the two slabs 10 and 11 between the positions shown in FIGS. 2 and 3, respectively. In the position in FIG. 2, the cavity 1' does not communicate with the injection channel 3. In the position in FIG. 3, this cavity and this channel do communicate.

Figure 3:
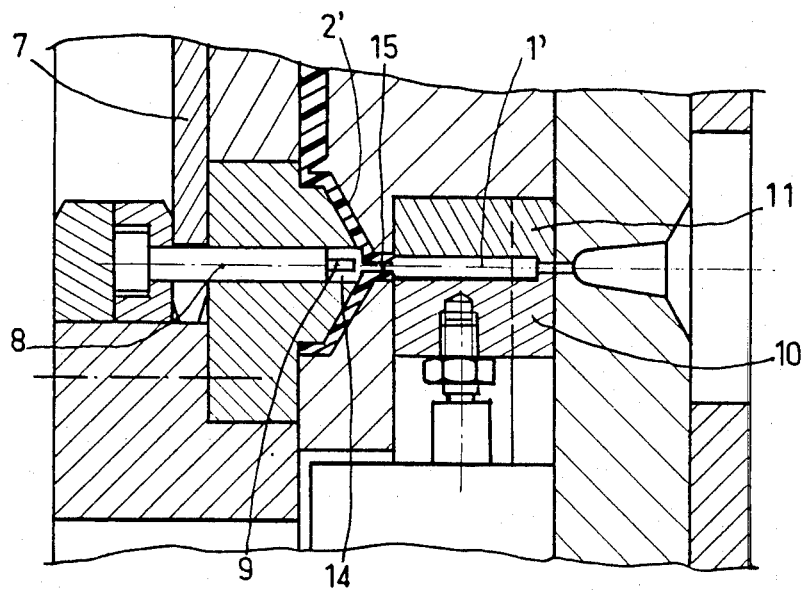
FIG. 3 is a view similar to that in FIG. 2 taken at the assembly stage of the process according to the invention.

The rod 8 is movable between the position shown in FIG. 2 and that shown in FIG. 3. In this latter position, the core 9 no longer bears on the slab 10. It is withdrawn towards the left, as seen in this figure, so as to place the cavities 1' and 2' in communication, under conditions which will be made clear further on in connection with the description of the operation of the system according to the invention.

The part 7 is movable between the positions shown in FIGS. 2 and 3 to control the position of the core 9. In the position in FIG. 3, the part 7 places itself (under the effect of means not shown, which may take various forms known to the specialist) between the half-chill 6 and the base 13 of the rod 8, to keep the core 9 out of the chamber 2'.

In order to achieve the unit in FIG. 1 with the aid of the system in FIGS. 2 and 3, the following operational sequence is established: with the system in the state shown in FIG. 2, some of the material intended to constitute the stile 2 is injected into the cavity 2', through the channel 4. It will be noted that the material will then mold itself around the core 9 placed against the slab 10.

Once the material contained in the cavity 2' has become solid, means (not shown) cause the part 7 and the jack 12 to move from the positions shown in FIG. 2 to those in FIG. 3. The core 9 then opens up a small enclosure 14 which communicates with the cavity 1' through a passage like a hole 15 formed in the material of the stile 2 molded in the cavity 2' through the core 9 while it was in the position in FIG. 2 during injection of the material of the stile. The enclosure 14 is limited by the core 9, the rod 8, a part of the bore of the chill 6 in which the rod 8 slides, and by the part of the stile 2 surrounding the hole 15.

The stile 2 having been molded and the system according to the invention being in the state shown in FIG. 3, the transparent plastic intended to form the window 2 is injected into the cavity 1' through the channel 3. This injection is made possible by the action of the jack 12, which has moved the slabs 10 and 11 so as to simultaneously align the cavity 1' and the hole 15 as well as the cavity 1' and the injection channel 3.

The material injected through the channel 3 fills not only the cavity 1' but also passes through the hole 15 to fill up the small enclosure 14 extending beyond the hole. After solidifying and cooling, the window molded in the cavity 1' is solidly attached to the stile 2 molded in the cavity 2' because of the material of the window filling the hole 15 and the enclosure 14, thus forming a part like an assembly stud for the window and the stile. The head of this stud, formed in the enclosure 14, has a transversal size greater than that of the hole 15. This assures the inseparability of the window and the stile.

The window-stile unit is removed by means for opening the mold (not shown) that are well known to the specialist.

The operational cycle described above may be started again right away, which gives the system according to the invention great productivity, reducing the assembly times and costs found in the classic manufacturing processes for window-stile units.

It will be noted that assembly of the stile and the window is assured by welding and/or by mechanical attachment. Indeed, the injection sequence of the two plastic materials may be suitably adjusted so that they come in contact at a temperature favoring their welding. In addition, should these plastics be incompatible in terms of welding, a strong mechanical attachment of the stile and the window is obtained with the form described above of the assembly stud molded into the enclosure 14 and the hole 15.

Thus the invention makes it possible to achieve a light window-stile unit by molding of a window in transparent plastic, in which each element consists of a material appropriate to its function.

In the particular case of the unit described above, a transparent material is utilized for the window and a material having good mechanical resistance for the stile. Despite the variety of the assembled materials, the unit has a monobloc character which facilitates its assembly and the solving of tightness problems which are especially significant when this unit is intended for an automobile. In addition, the use of molded elements allows a wide choice of forms and colors for the unit's elements.

Because of the concomitance of the molding and assembly operations, the productivity of the system according to the invention can be very high. The operational sequence of this system also lends itself to automation favorable to this productivity by classic control means well known to the specialist.

Naturally the invention is not limited to the realization of units consisting of a window and a stile. For example, it could be adapted without difficulty to the molding of tightness joints on windows. More generally, the invention extends to the making of any unit composed of parts molded and assembled by means of assembly parts created during the molding operations.

We claim:

1. In a process for molding and assembling a unitary transparent plastic window and stile assembly, the steps comprising:

forming a first elongated mold cavity;

positioning a movable rod in a first position in said first mold cavity, said movable rod having a core positioned at a side portion of said first mold cavity;

positioning a movable mold member in a first position such that said movable mold member closes said side portion of said first mold cavity;

filling said first mold cavity with a first hardenable plastic material selected for strength;

permitting said first material to harden so as to form said stile;

moving said rod in a first direction from said first position to a second position, such that a space occupied by said core in said first position defines an open passage through said stile, and said core in said second position, together with surrounding members, defining an enclosure adjacent said stile in said first direction from said stile and communicating with said passage;

moving said movable mold member transverse to said first direction such that a second mold cavity in said movable mold member is positioned adjacent said side portion of said first mold cavity and along said first mold cavity, and communicates with said passage;

filling said second mold cavity, said passage and said enclosure with a second transparent plastic material which welds with said first material upon hardening; and permitting said second material to harden and weld with said first material to form said assembly, with said window being interlocked with said stile through said passage.

2. Unit of at least two plastic parts, wherein said parts are molded and assembled according to the method of claim 1.

* * * * *